United States Patent [19]

Kondo

[11] 4,381,089
[45] Apr. 26, 1983

[54] WOUND-TAPE RADIUS DETECTION SYSTEM FOR A TAPE RECORDER

[75] Inventor: Shigeyuki Kondo, Tokyo, Japan

[73] Assignee: Nippon Electric Industries, Co., Ltd., Tokyo, Japan

[21] Appl. No.: 211,155

[22] Filed: Nov. 28, 1980

[30] Foreign Application Priority Data

Nov. 27, 1979 [JP] Japan .................................. 54-153296

[51] Int. Cl.³ ........................ B65H 59/38; G03B 1/02; G11B 15/32
[52] U.S. Cl. ...................................... 242/191; 242/206
[58] Field of Search ............... 242/186, 187, 191, 206, 242/208–210; 360/71, 73, 74.1; 235/92 DN, 92 PB, 92 MP; 226/10, 45

[56] References Cited

U.S. PATENT DOCUMENTS 3,921,220 11/1975 Primosch et al. ..................... 360/72
4,001,552 1/1977 Muller ............................ 235/92 DN
4,097,726 6/1978 Satoh et al. .................... 235/92 MP Primary Examiner—Leonard D. Christian
Attorney, Agent, or Firm—Sughrue, Mion, Zinn, Macpeak and Seas

[57] ABSTRACT

A wound-tape radius detecting system for use in reel to reel audio and video tape decks includes first and second photoelectric devices which act as supply or take-up reel and tape transport tachometers, resepctively. The ratio of the pulses outputs of the two photoelectric devices are indicative of the amount, or radius, of tape on the supply or take-up reel, which information can be used to control the braking torque applied to the reels when the tape deck is stopped, or the reel motor torque at the start of transport.

6 Claims, 11 Drawing Figures

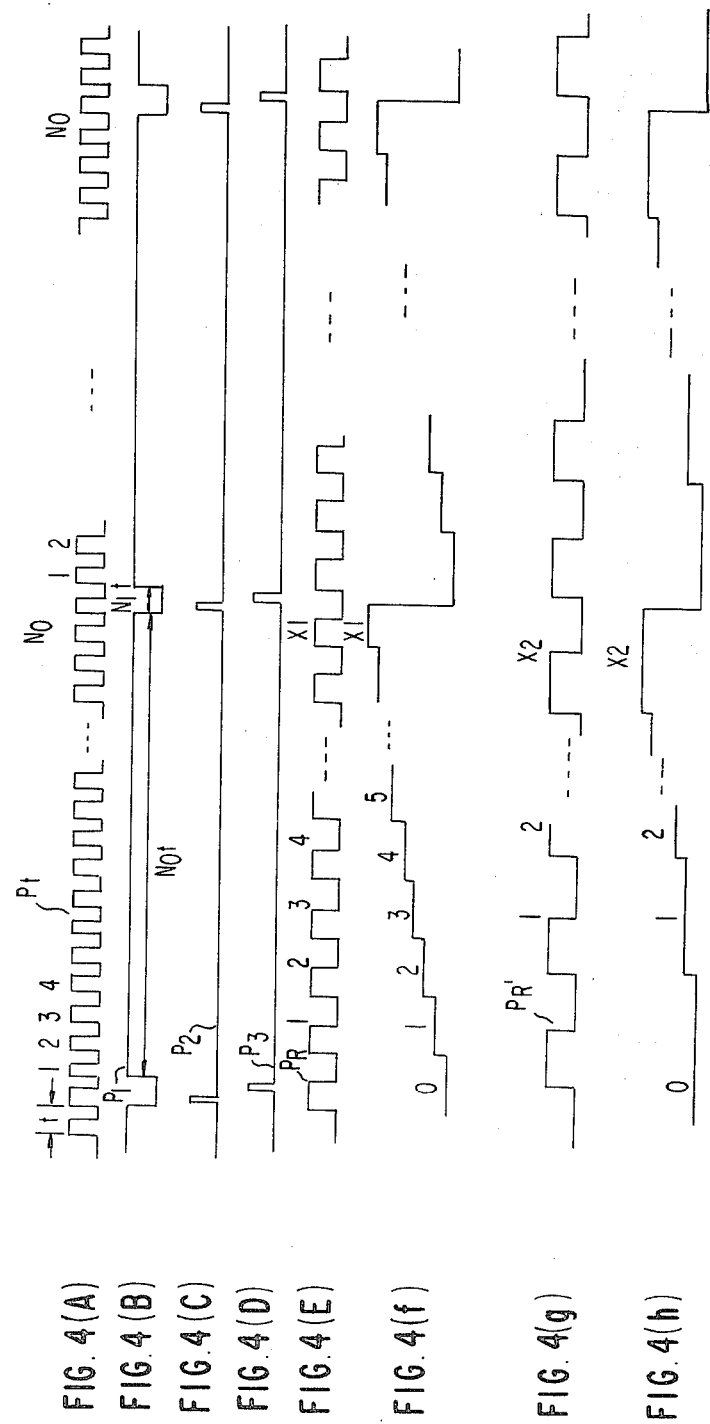

WOUND-TAPE RADIUS DETECTION SYSTEM FOR A TAPE RECORDER

BACKGROUND OF THE INVENTION

This invention relates to a wound-tape radius detection system for detecting the radius of a tape wound on a reel in a reel to reel tape recorder such as an audio tape recorder, a video tape recorder, or a data tape recorder. The wound-tape radius detection system may be applied to, for example, a tape-end detector.

In a tape recorder, a tape is transported from one reel (e.g., a supply reel) to the other reel (e.g., a take-up reel) in for example, recording, playback, and fast forward modes and vice versa in a rewind mode. As the tape is being transported, radii of the tapes wound on the reels are inversely with respect to each other.

In the case where the tape is expected to be smoothly stopped in a small period of time from the fast forward or fast rewind mode, a greater braking torque must be applied to the reel having the larger radius of wound tape, and a smaller braking torque should be applied to the other reel with the smaller radius of tape. Further, in the case where the tape is started to begin transport from the stop mode, the reels must be controlled in response to the wound-tape radii. Because wound-tape radius detection systems of the prior art require a complicated construction, they have not been applied to a tape recorder.

Furthermore, it is often desirable not to completely wind or rewind the tape on the take-up or supply reel in order to avoid re-threading of the tape. For this purpose, there has been proposed a tape end detector, as disclosed in the U.S. Pat. No. 4,213,583 entitled "REEL DRIVE MOTOR CONTROL SYSTEM FOR CASSETE/CARTRIDGE TAPE RECORDERS" issued to Mitani et al. and assigned to the present assignee, in which the tape end is detected through the calculation of the ratio between the rotational speeds of the take-up and supply reels. The tape-end detection is based on the fact that the length of the tape encased in a cassette or a cartridge is prefixed and that the rotational speed of the supply or take-up reel is in direct proportion to the length of the tape actually wound on the reel, whereby the location of the front or rear end of the tape can be predicted through the calculation of the above-mentioned speed ratio. However, this tape-end detection is not applicable to an open-reel type tape recorder.

SUMMARY OF THE INVENTION

It is therefore an object of this invention to provide a wound-tape radius detection system with a simplified system construction.

It is another object of this invention to provide a wound-tape radius detection system capable of detecting the radius of a tape wound on a reel in an open-reel type tape recorder.

According to this invention, there is provided a wound-tape radius detection system, in which the wound-tape radius is detected through the calculation of the ratio between the rotational speed of the reel and the rotational speed of a reference roller rotating in response to the tape-transport speed.

This invention is based on the fact that the tape-transport speed is in direct proportion to the length of the tape actually wound on the reel and the rotational speed of the reel.

BRIEF DESCRIPTION OF THE DRAWINGS

The features and advantages of this invention will become more apparent from the following detailed description taken in conjunction with the accompanying drawings, wherein;

FIGS. 4(A) to 4(H) are waveform diagrams for explaining the operation of the structure of FIG. 3.

DETAILED DESCRIPTION OF THE PREFERRED EMBODIMENT

It is assumed in the description of the embodiment that the tape recorder to which the invention is applicable is an open-reel type video tape recorder having a rotary head. However it should be noted that the embodiment is usable in recording reproducing equipment for audio and data signals as well.

Figure 1:
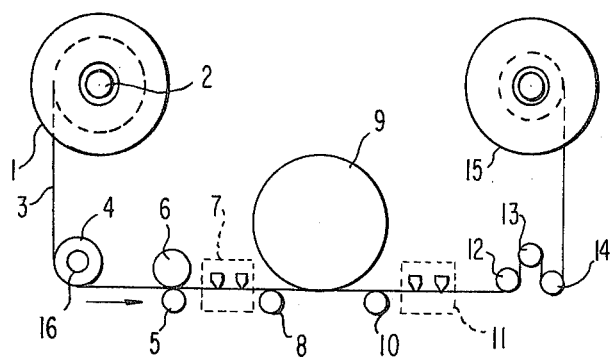
FIG. 1 is a schematic plan view of a video tape recorder to which the present invention is applicable.

Referring to FIG. 1, a supply reel 1 of the video tape recorder is rotated with its center fixed to a rotary shaft 2. In a normal recording or reproducing mode, a magnetic tape 3 wound on the supply reel 1 is transported at a constant speed in the direction indicated by the arrow, due to the pulling force exerted on the tape by a capstan roller 5 driven by a capstan motor (not shown) and a pinch roller 6. A timer roller 4 is disposed between the reel 1 and the capstan roller 5 for the redirection of the tape 3. After passing through a first audio head 7 and a guide post 8, the tape 3 runs along the outer cylindrical surface of a drum 9. The tape coming out of the drum 9 passes through an outlet guide post 10, a second audio head 11, guide rollers 12, 13 and 14, and is wound on a take-up reel 15 mounted within the tape recorder apparatus. The guide roller 13 may be mounted on a tension arm (not shown) to maintain a suitable tension in the tape 3. The drum 9 includes a rotary disc and video heads mounted onto the outer circumference thereof and is adapted to be brought in contact with the magnetic tape 3.

Figure 2:
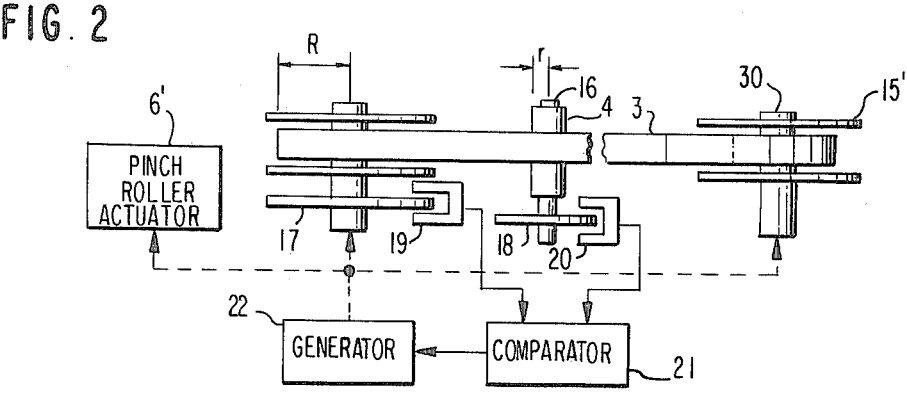
FIG. 2 is a schematic side view of a supply reel, a take-up reel and a reference roller together with rotational speed detectors, and other mechanical and electrical elements in blocks.

In FIG. 2, on the rotary shaft 2 for the supply reel 1 is provided a rotary disc 17, while on a rotary shaft 16 for the timer roller 4 is provided a rotary disc 18. A series of small apertures are formed at an equal interval along the circumferential portion of each of the rotary discs 17 and 18, with photodetector-emitter combinations 19 and 20 disposed facing the apertures. It will be seen that the combination of the disc 17 and the photo-emitter-detector 19 forms an optical tachometer for the supply reel 1, while that of the disc 18 and emitter-detector 20 forms another optical tachometer for the timer roller 4. The timer roller 4 with the tachometer is known in the art, and is normally used for a tape counter. In the present embodiment, the timer roller 4 is employed as a reference roller, and it is noted that a reference roller may be provided separately from a timer roller according to this invention. It should be noted that the timer roller 4 is "freely rotatable" and will rotate in either direction at any tape speed, as opposed to being a driven roller such as a capstan roller which can only rotate at the speed at which it drives the tape.

The outputs of the detectors 19 and 20 are fed to a comparator 21, whose output is converted to a control signal by a control signal generator 22 to control the rotation of the rotary shafts 2 and 15' for the supply and take-up reels 1 and 15. The mechanical control effected onto to shafts 2 and 16 is shown by dotted lines in the drawing. The same mechanical control is applied to the pinch roller actuator 6' to release the pinch roller 6 at the end of the forward drive.

It will be seen in FIG. 2 that the rates of pulses generated at each of the detectors 19 and 20 are in direct proportion to the rotational speeds of the reel 1 and the timer roller 4, respectively. Therefore, the comparison of the rates of pulses fed from these detectors gives information about the amount of tape wound on the supply reel 1.

The comparison of the speeds represented by the pulse rate will now be described in more detail. First, the radial length from the center rotary shaft 2 to the outer circumference of the tape wound on the supply reel 1 will be called hereunder a "wound-tape radius". Representing the wound-tape radius of the supply reel 1 by R, the speed of rotation of the same by $W_R$, the radius of the timer roller 4 by r, the speed of rotation of the same by $W_r$, and the velocity of the transportation of the tape by V, the following relations are fulfilled:

$$V = 2\pi r W_r = 2\pi R W_R \quad (1)$$

Accordingly, the wound-tape radius R for the supply reel 1 is represented by:

$$R = (W_r/W_R) \cdot r \quad (2)$$

In other words, the wound-tape radius R is the product of the radius r of the timer roller 4 and the ratio of rotation speeds $W_r$ and $W_R$ between the timer roller and the supply roller. Because the radius r of the timer roller 4 is predetermined and fixed, the wound-tape radius R can be obtained by detecting the ratio of the rotation speeds.

Figure 3:
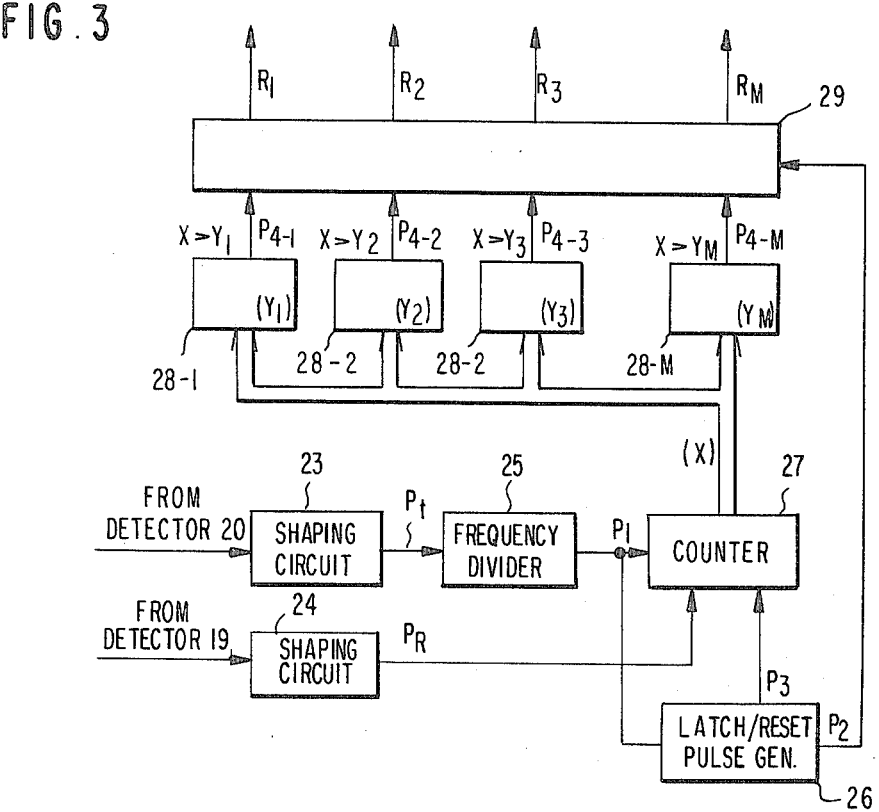
FIG. 3 is a block diagram showing a part of the electrical element shown in FIG. 2.

Referring to FIG. 3, the pulses fed from the detectors 20 and 19 (FIG. 2) are shaped at pulse shaping circuits 23 and 24, respectively. The output of the shaping circuit 23 will be called "timer pulses" $P_t$, hereunder, and that of the shaping circuit 24 "reel pulses" $P_R$. The pulses $P_t$ shown in FIG. 4(A) have a repetition frequency proportional to the tape-transport speed V, and are fed to a frequency-divider 25. The frequency-divider 25 produces divided pulses $P_1$ having a high level for a period $N_0 \cdot t$ equal to one repetition period (t) of the timer pulses $P_t$ multiplied by $N_0$ and a low level for a period $N_1 t$ (in the embodiment, $N_1 = 1$), as shown in FIG. 4(B). The divided pulses $P_1$ are fed to a latch/reset pulse generator 26, which generates latch pulses $P_2$ and reset pulses $P_3$, as shown in FIGS. 4(C) and 4(D), within a period t at which the pulses $P_1$ have the low level.

The counter 27 counts the reel pulse $P_R$ (FIG. 4(E)) supplied thereto as a clock pulse. The counting in the counter 27 is performed only when the pulse $P_1$ has the high level, i.e., for the period $N_0 t$. The counter 27 is reset by the reset pulse $P_3$. Assuming that the wound-tape radius R is relatively small, i.e., the repetition frequency of the reel pulses $P_R$ is relatively high, the counted value (X) in the counter 27 at the end of the period $N_0 t$ is $X_1$, as shown in FIG. 4(F). In the case where the wound-tape radius R is relatively large, i.e., the repetition frequency of the reel pulses $P_R$ is relatively low as shown in FIG. 4(G), the counted value $X_2$ is less than $X_1$, as shown in FIG. 4(H).

The counted value (X) is supplied to the comparators 28-1 to 28-M, in which the counted value (X) is compared with predetermined values $Y_1, Y_2, \ldots Y_M$ ($Y_1 < Y_2 < \ldots < Y_M$), respectively. The comparators 28-1 to 28-M produce pulses $P_{4-1}$ to $P_{4-M}$ having high levels when $X > Y$ ($Y_1$ to $Y_M$) and low levels when $X \leq Y$. The pulses $P_{4-1}$ to $P_{4-M}$ are supplied to a latch circuit 29 and latched in response to the latch pulse $P_2$. Assuming that $Y_1 < Y_2 < Y_3 < X_1 < Y_4 \ldots < Y_M$, the outputs $R_1$, $R_2$ and $R_3$ of the latch circuit 29 are at high level and the others $R_4$-$R_M$ are at low-level. When $Y_1 < X_2 < Y_2 < \ldots < Y_M$, only the output $R_1$ is at high level and the others $R_2$-$R_M$ are at low level. Thus, the wound-tape radius is detected by comparing the counted value (X) with the predetermined values $Y_1$ to $Y_M$, i.e., by detecting the combination of the levels of the output pulses $R_1$ to $R_M$.

If the value $Y_1$ is selected to correspond to the minimum wound-tape radius $R_m$ indicative of the tape end, the tape end can be detected by detecting the level-change from high level to low level in the output pulse $R_1$. In other words, the output pulse $R_1$ may be used as a tape-end-detection signal. The output pulse $R_1$ is fed to the control signal generator 22 (FIG. 2) to control the rotation of the rotary shafts 2 and 15' for the supply and take-up reels 1 and 15.

The output pulses $R_1$ to $R_M$ may be used for controlling the brake torque for the supply and take-up reels when the tape is desired to be smoothly stopped, and for controlling the reel motor torque when the tape is first started to transport. The use of the pulses $R_1$ to $R_M$ makes it possible to reduce the period of time for which the tape position is searched in the computer-controlled tape recorder.

What is claimed is:

1. A wound-tape radius detection system for a tape apparatus, said apparatus of the type comprising a supply reel having a tape wound thereon, a take-up reel arranged to wind up said tape as passed thereto from said supply reel, a transducer provided on a tape transport path between said supply and take-up reels, and transporting means for transporting said tape, said detection system comprising:
   means coupled with one of said supply and take-up reels for producing a first detection signal representing the speed of the rotation of said one reel;
   freely rotatable roller means for rotating in response to transport of said tape;
   means coupled with said freely rotatable roller means for producing a second detection signal representing the speed of transport of said tape; and
   detecting means responsive to said first and second detection signals for detecting the radius of the tape wound on said one reel.

2. The detection system as claimed in claim 1 in which said detecting means includes means for producing a control signal representative of the ratio between the speed of rotation of said one reel and the speed of tape transport and means responsive to the control signal for controlling said transporting means.

3. The detection system as claimed in claim 2, wherein said detecting means further comprises a pair of photoelectric devices, a first of said photoelectric devices being operable to output pulses in response to the rotation of said one reel, and a second of said photoelectric devices being operable to output pulses in response to the rotation of said roller, said roller being engaged with said tape at a point along the transport path between said supply and take-up reels.

4. The detection system as claimed in claim 3, further comprising frequency divider means for receiving the output of said second photoelectric device and producing divided pulses having a high level and a low level, and a counter for counting clock pulses in accordance with a control input, said counter receiving said divided pulses as said control input and receiving the output of said first photoelectric device as said clock pulses.

5. The detection system as claimed in claim 4, further comprising latch/reset pulse generator means and a latch circuit, said latch/reset pulse generator means providing output pulses for resetting said counter and controlling said latch circuit during a time in which said divided pulses have said low level, said counter counting said clock pulses only when said divided pulses have said high level.

6. The detection system as claimed in claim 5, further comprising a plurality of comparators each receiving an output from said counter representing the counted value in said counter, each said comparator being operable to produce a high level pulse when said counted value exceeds a respective predetermined value and to produce a low level pulse otherwise, said pulses produced by said comparators being supplied to said latch circuit and latched in response to output pulses from said latch/reset pulse generator means, whereby combinations of the outputs of said latch circuit are indicative of the wound-tape radius on said one reel.

* * * * *

UNITED STATES PATENT AND TRADEMARK OFFICE
CERTIFICATE OF CORRECTION

PATENT NO. : 4,381,089

DATED : April 26, 1983

INVENTOR(S) : Shigeyuki Kondo

It is certified that error appears in the above-identified patent and that said Letters Patent is hereby corrected as shown below:

On the cover page, in the heading of the patent, amend item (73) to read as follows:

--Assignee: Nippon Electric Co., Ltd.--

Signed and Sealed this

Twenty-eighth Day of February 1984

[SEAL]

Attest:

Attesting Officer

GERALD J. MOSSINGHOFF

Commissioner of Patents and Trademarks